(12) United States Patent
Wang et al.

(10) Patent No.: US 8,715,536 B2
(45) Date of Patent: May 6, 2014

(54) CONDUCTIVE MATERIAL FORMED USING LIGHT OR THERMAL ENERGY, METHOD FOR FORMING THE SAME AND NANO-SCALE COMPOSITION

(75) Inventors: Yu Ming Wang, Taichung (TW); Yion Ni Liu, Hsinchu (TW); Yeu Kuen Wei, Hsinchu (TW); Chen Chih Yeh, Zhunan Township, Miaoli County (TW); Ming Jyh Chang, Keelung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 351 days.

(21) Appl. No.: 12/788,684

(22) Filed: May 27, 2010

(65) Prior Publication Data

US 2011/0062389 A1 Mar. 17, 2011

(30) Foreign Application Priority Data

Sep. 14, 2009 (TW) .............................. 098130869 A
Mar. 31, 2010 (TW) .............................. 099109816 A

(51) Int. Cl.
*H01B 1/02* (2006.01)
(52) U.S. Cl.
USPC ............ 252/514; 252/500; 977/762; 977/932
(58) Field of Classification Search
USPC .......................... 252/514, 500; 977/762, 932
See application file for complete search history.

(56) References Cited

U.S. PATENT DOCUMENTS 6,322,713 B1 * 11/2001 Choi et al. ...................... 216/38
7,087,920 B1    8/2006 Kamins
7,341,680 B2 *  3/2008 Pan et al. ...................... 252/500
7,494,907 B2    2/2009 Brown et al.
2006/0197064 A1 * 9/2006 Pan et al. ...................... 252/500
2007/0074316 A1 3/2007 Alden et al.
2007/0274895 A1 * 11/2007 Jesih et al. .................... 423/462
2008/0143906 A1 6/2008 Allemand et al.
2008/0173344 A1 7/2008 Zhang et al.
2008/0259262 A1 10/2008 Jones et al.
2011/0291032 A1 * 12/2011 Sun et al. ................... 250/515.1

FOREIGN PATENT DOCUMENTS

| CN | 1873838 A | 12/2006 |
|---|---|---|
| JP | 2006070300 A | 3/2006 |
| JP | 200094033 A | 4/2009 |
| JP | 2011060751 A * | 3/2011 |
| TW | 200810136 A | 2/2008 |
| TW | 200810167 A | 2/2008 |
| WO | 2005001420 A2 | 1/2005 |

OTHER PUBLICATIONS

Translation of JP 2006070300, Mar. 16, 2006.*
Aug. 30, 2011 Office Action for Chinese counterpart application.
Aug. 30, 2011 Office Action for Chinese counterpart application translated into English.
Apr. 26, 2012 Office Action for Chinese counterpart application.
Apr. 26, 2012 Office Action for Chinese counterpart application translated into English.

* cited by examiner

*Primary Examiner* — Douglas McGinty
(74) *Attorney, Agent, or Firm* — Egbert Law Offices, PLLC

(57) ABSTRACT

An electrically conductive material includes a plurality of nanowires and a plurality of nanoconnectors. The ratio by weight of the plurality of nanowires to the plurality of nanoconnectors is in a range of from 1:9 to 9:1. Nanoconnectors can be heated by thermal energy or light energy so that the nanoconnectors can be closely interconnected to each other and to nanowires, resulting in significant increase of the electrical conductivity of the electrically conductive material.

37 Claims, 9 Drawing Sheets

CONDUCTIVE MATERIAL FORMED USING LIGHT OR THERMAL ENERGY, METHOD FOR FORMING THE SAME AND NANO-SCALE COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to an electrically conductive material, and particularly relates to an electrically conductive material with nanostructures.

2. Description of Related Art Including Information Disclosed Under 37 CFR 1.97 and 37 CFR 1.98

The 3C products with characteristics of light weight, thin profile, small size, softness, and flexibility are required in this century. According to the IDTechEX 2005 statistical report, the market for flexible electronics will reach to US$4.75 billion in 2010. The report also predicts that the flexible electronics market will grow to US$250 billion before 2025. The report reveals that a conductive composition, which can be cured at a low temperature and formed into a conductive film with high adhesion force for attaching to a flexible substrate, is necessity. NanoMarkets in 2006 estimated that the market for conductive inks will grow from US$1.10 million to US$1.36 billion between 2007 and 2010. It can be seen that the development of conductive inks can effectively enhance the development of new flexible electronics and flexible sensor industries. In addition, conductive inks can be used for forming patterned conductive layers on substrates using an inkjet or screen printing technique which does not need complicated lithographic processes, resist-development processes, or vapor deposition processes. Therefore, our processes can meet the world trend of saving energy, reducing carbon generation, and lowering cost.

Conductive inks include conductive fillers, which can be metal or alloy material such as gold, silver, copper, iron and aluminum. When the size of the conductive filler is reduced in nanoscale, the surface area of the conductive filler may increase sharply. This could cause the melting point of the conductive fillers to decrease and make the conductive fillers easier to anneal to each other. For example, silver has a melting point of 690 degrees Celsius. When the size of silver nanoparticles is reduced to 2 nanometers, the melting point of the silver nanoparticles may decreases to around 100 degrees Celsius. Currently, the most popular conductive filler on the market is silver nanoparticle filler. Compared to other metal nanoparticles, silver nanoparticles have advantages of low price, high electrical conductivity, lower annealing temperature, and high stability. In addition, silver oxide nanoparticles are conductive. Therefore, silver nanoparticles are widely applied. Copper nanoparticle filler is another low cost material with high electrical conductivity compared to that of silver nanoparticles; but copper nanoparticles are easily oxidized, and therefore have a limit in application.

Conductive ink comprises conductive particles, a linker, and an auxiliary agent. When a conventional conductive ink is coated on a substrate using inkjet or screen printing technique, the electrical conductivity of the conductive film must be annealed at a high temperature to remove the linker, solvent, and other mixing materials so as to increase its conductivity. This high temperature heating process could damage the substrate and other materials because of their different thermal expansion coefficients. In particular, when a substrate is made of materials with different coefficients of thermal expansion, it could cause the thermal cracks. Furthermore, this heating process also could damage a soft substrate having a low melting point, for example a polyethylene terephthalate substrate or a polymethyl methacrylate substrate.

U.S. Patent Publication No. 2007/0,074,316 discloses a transparent conductor including a substrate and a plurality of silver nanowires. The silver nanowires form a network structure embedded in a matrix so as to form an optically transparent and electrically conductive layer.

U.S. Pat. No. 7,341,680 discloses a printable composition with two types of materials. The first type of material can be of wire shape, conical shape, round shape, or plate shape, and can have an aspect ratio greater than 1:3, and the second type of material can be of round shape, elliptical shape, cylindrical shape, or pyramidal shape, and can fill into the pores of the first type of material. This electrically conductive film composition exhibits better flatness and higher conductivity.

In summary, conventional conductive layers fabricated using electrically conductive inks or pastes having nanoparticles require a high temperature sintering process likely to cause unwanted consequences, and the electrically conductive layers fabricated using inks having nanowires may have issues of low density and poor flatness and the electrical conductivity thereof cannot be further increased. Therefore, there is a need to develop a conductive layer having good flatness and high density without requiring a high temperature annealing process, and a method for manufacturing the same.

BRIEF SUMMARY OF THE INVENTION

One embodiment of the present disclosure provides an electrically conductive material formed using light or thermal energy, comprising a plurality of nanowires and a plurality of nanoconnectors, wherein the ratio by weight of the nanowires to the nanoconnectors is in a range of from 1:9 to 9:1.

One embodiment of the present disclosure provides a method for forming an electrically conductive material using light or thermal energy. The method comprises the steps of: providing a resulting composition including a plurality of nanowires and a plurality of nanoconnectors, wherein a ratio by weight of the nanowires to the nanoconnectors is in a range of from 1:9 to 9:1; and drying the resulting composition to obtain a mixture of the nanowires and the nanoconnectors.

One embodiment of the present disclosure further provides an electrically conductive composition comprising a resulting solvent, a plurality of nanowires, and a plurality of nanoconnectors, wherein a ratio by weight of the nanowires to the nanoconnectors is in a range of from 1:9 to 9:1.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the invention.

DETAILED DESCRIPTION OF THE INVENTION

One exemplary embodiment of the disclosure proposes an electrically conductive material with nanostructures comprising a plurality of nanowires and a plurality of nanoconnectors. The plurality of nanowires can be formed into a network-like structure or a network structure embedded in an electrically conductive material, providing the electrically conductive material with greater electrical conductivity. The network-like or network structure can be a porous structure, and the nanoconnectors can be filled into the pores of the network-like or network structure so as to increase the density of the electrically conductive material. It can be seen that the network-like or network structure may cause the electrically conductive material to have a rough surface, and the nanoconnectors can fill the pores in the network-like or network structure so as to improve the surface flatness of the electrically conductive material. In addition, the nanoconnectors have characteristics of absorption of specific wavelengths and low melting point due to their high surface area-to-volume ratio, and therefore the electrical conductivity of the electrically conductive material can be further increased by melting the nanoconnectors using heat or light energy.

Figure 1:
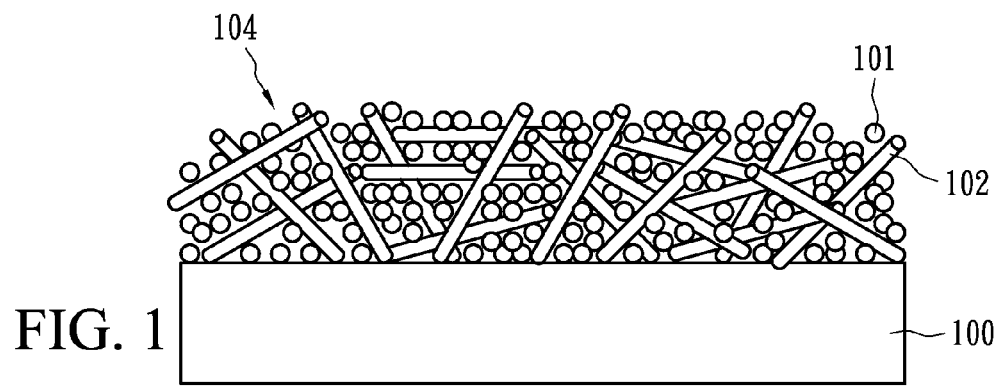
FIG. 1 is a schematic diagram showing an electrically conductive material including mixed nanowires and nanoconnectors according to one embodiment of the present invention.
Figure 2:
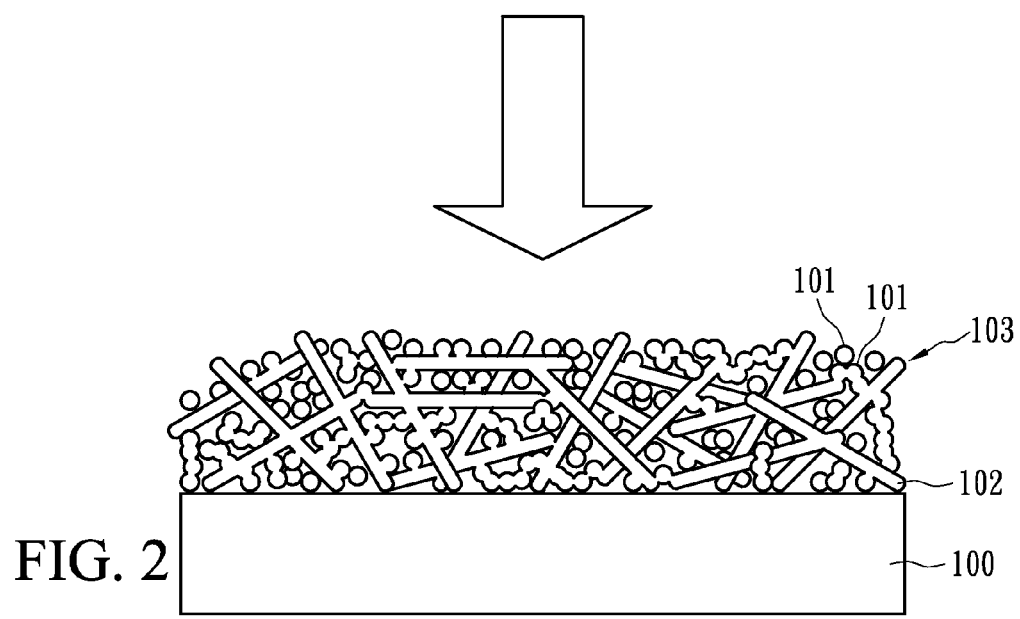
FIG. 2 is a schematic diagram showing nanoconnectors interconnected to each other and to nanowires after the application of light or thermal energy according to one embodiment of the present invention.

Referring to FIGS. 1 and 2, the difference between the disclosure of U.S. Patent Application No. 2007/0,074,316 and the present disclosure is described as follows: One embodiment of the present invention provides an electrically conductive ink 104 composed of a plurality of nanoconnectors 101 and a plurality of nanowires 102, which can be used to form a patterned electrically conductive layer 103 on a substrate 100 using a screen printing or spray coating technique. Light energy or thermal energy is then applied to the patterned electrically conductive layer 103 to cause adjacent nanoconnectors 101 to sinter together and to cause adjacent nanoconnectors 101 and nanowires 102 to sinter together. The electrically conductive layer 103 of the present disclosure exhibits a 50% increase in the electrical conductivity over that of traditional electrically conductive layers that include only nanowires.

In contrast to the invention disclosed in U.S. Pat. No. 7,341,680, the present disclosure comprises use of two different types of materials. The first type of material can be nanowires 102 with an aspect ratio of above 10. The material of the nanowire may be gold, silver, copper, indium, palladium, aluminum, or combinations thereof. The present disclosure further comprises a material of a second type, which can be nanoconnectors 101. Light energy or thermal energy can be applied to the nanoconnectors 101 so that adjacent nanoconnectors 101 can be interconnected together. The material of the nanoconnector 101 can be gold, silver, copper, indium, palladium, aluminum, or combinations thereof. The nanoconnector 101 can have a diameter of less than 100 nanometers. After the nanowires 102 and the nanoconnectors 101 are mixed, light energy or thermal energy can be applied to the mixture to melt the material of the second type, thereby interconnecting the material of the first type and the material of the second type, and obtaining an electrically conductive continuum.

In the electrically conductive material of one exemplary embodiment of the disclosure, a suitable amount of nanoconnectors 101 can be added to fill the pores in the network structure formed by nanowires 102 to increase the electrical conductivity of the electrically conductive material. In the electrically conductive material of one exemplary embodiment of the present disclosure, the ratio by weight of the nanowires 102 to the nanoconnectors 101 can be in a range of from 1:9 to 9:1, or the value of the ratio by weight of the nanowires 102 to the nanoconnectors 101 can be 0.1 to 9. In another exemplary embodiment, the ratio by weight of the nanowires 102 to the nanoconnectors 101 can be in a range of from 1:4 to 2:3, or from 1:5 to 4:1. the value of the ratio by weight of the nanowires 102 to the nanoconnectors 101 can be 0.2 to 4.

The nanowire 102 of one exemplary embodiment has a one-dimensional structure with an aspect ratio of from 10 to 800. Alternatively, in another exemplary embodiment, the nanowire 102 can have an aspect ratio of from 200 to 500. Further, in one exemplary embodiment of the present disclosure, the nanoconnector 101 can have a diameter of less than 100 nanometers.

The material of the nanoconnector 101 can be pure metal or composite metal material. In one exemplary embodiment, the nanoconnector 101 can be of metal such as gold, silver, copper, indium, palladium, aluminum, or combinations thereof with a diameter of less than 100 nanometers. The nanoconnector 101 may also be of a composite metal such as any combination of gold, silver, copper, indium, palladium, or aluminum. In addition, the material of the nanoconnector 101 may be gold-coated silver, silver-coated gold, gold-coated copper, copper-coated gold, silver-coated copper, copper-coated silver, or combinations thereof. Furthermore, the material of the nanowires 102 can be pure metal or composite metal material. In one exemplary embodiment, the material of the nanowires 102 can be metal such as gold, silver, copper, indium, palladium, or aluminum. The nanowires 102 may also be of composite metal such as any combination of gold, silver, copper, indium, palladium, or aluminum. In addition, the material of the nanowire may be gold-coated silver, silver-coated gold, gold-coated copper, copper-coated gold, silver-coated copper, copper-coated silver, or combinations thereof.

In one exemplary embodiment, in the electrically conductive material of the present disclosure, a suitable amount of nanoconnectors 101 is added to fill the pores in the network structure formed by nanowires 102 at room temperature. Through heating at a low temperature or light exposing, the nanoconnectors of the electrically conductive material are melted so that the nanoconnectors are interconnected to each other and to the nanowires so as to improve the surface flatness and to increase the density and the electrical conductivity. The heating temperature is one factor affecting the electrical conductivity. When nanoparticles are heated and melted, the nanoparticles tend to agglomerate under the influence of cohesive force. As a result, islands are formed and the electrical conductivity decreases. In one exemplary embodiment, the electrically conductive material composed of nanowires 102 and nanoconnectors 101 can be heated to a temperature equal to or below 200 degree Celsius for about one hour to enhance the binding of the nanowires 102 and the nanoconnectors 101. If low melting temperature nanoconnectors 101 and nanowires 102 are partially applied, for example silver nanowires or silver nanoconnectors, the mixture of the nanoconnectors 101 and the nanowires 102 can be sintered at a low temperature because their melting temperatures (under 180 degrees Celsius) are below 200 degrees Celsius. Consequently, the electrically conductive material may be formed to have large continuous bulk portions. The nanowires 102 are closely interconnected due to the sintering of the nanoconnectors 101, increasing the electrical conductivity of the electrically conductive material. The electrically conductive material of the present disclosure does not need a high temperature sintering process, and therefore the drawbacks of using a high temperature sintering process can be avoided.

Following are several examples to explain the disclosure.

Example 1

Example 1 describes a method for manufacturing an electrically conductive material. A mixture of 15 grams of silver nanoconnectors and silver nanowires is introduced into 100 grams of butanol used as a solvent, and the mixture is stirred using a stirrer. After the addition of 1.5 grams of polyvinylpyrrolidone used as a linker, the mixture is stirred again. After the addition of about 0.3 grams of BYK-410 from Byk-Chemie, Germany, the mixture is stirred, and the mixture or the resulting composition can now be used as an electrically conductive ink. The resulting composition is coated on a substrate, and then heated to a temperature of 110 degrees Celsius for about 15 minutes to solidify, and an electrically conductive material is formed on the substrate. In this case, the silver nanowires and the silver nanoconnectors can be mixed in different ratios, wherein the ratios can range from 1:9 to 9:1 by weight.

After solidification of the electrically conductive material, the silver nanoconnectors can fill the pores of the network structure formed with nanowires.

Figure 3:
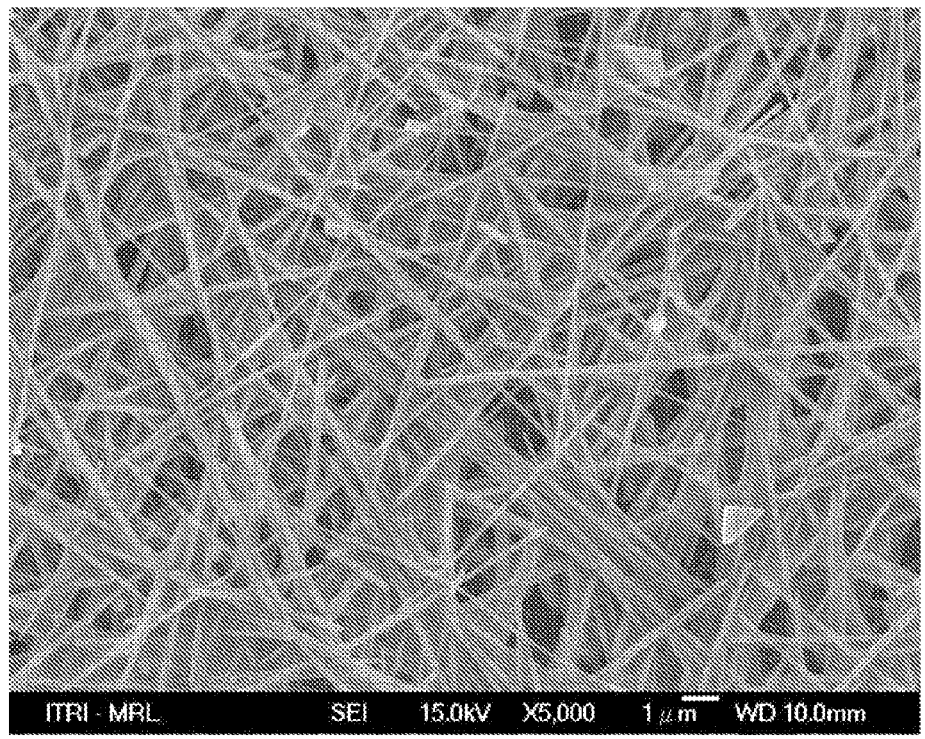
FIG. 3 is a photograph of a scanning electron microscope image of an electrically conductive material including nanowires and nanoconnectors mixed in a ratio of 4:1 according to the first exemplary embodiment of the present disclosure.

FIG. 3 is a photograph of a scanning electron microscope image of an electrically conductive material including nanowires and nanoconnectors mixed in a ratio of 4:1 (or mixed in a ratio value of 4) according to the first exemplary embodiment of the present disclosure. As shown in the photograph of FIG. 3, the nanoconnectors partially fill the pores between the nanowires.

Figure 4:
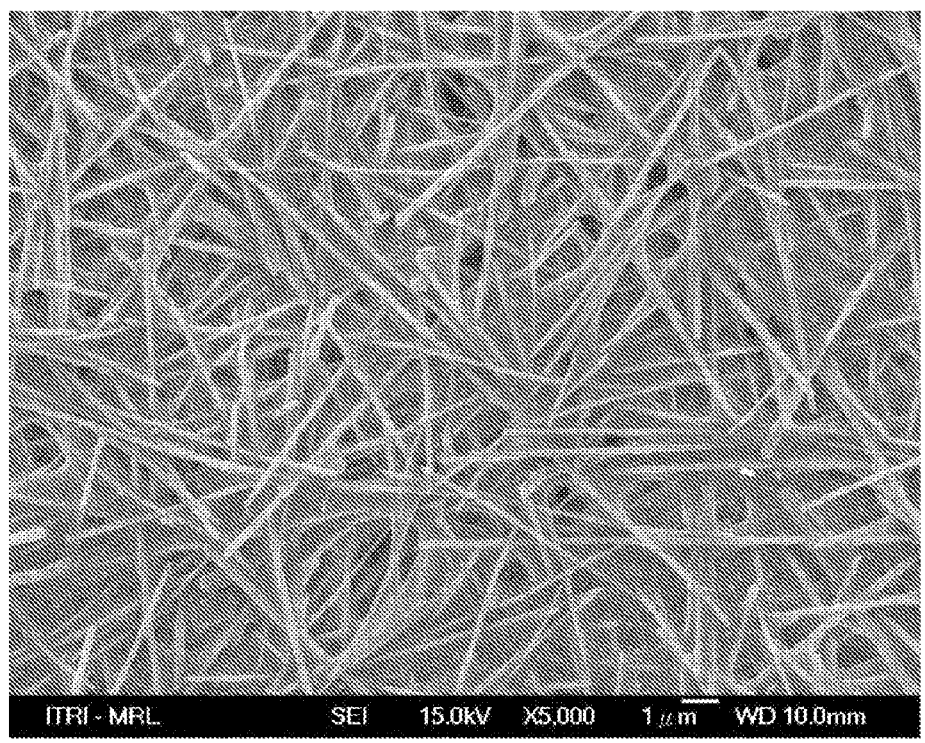
FIG. 4 is a photograph of a scanning electron microscope image of an electrically conductive material including nanowires and nanoconnectors mixed in a ratio of 3:2 according to the second exemplary embodiment of the present disclosure.

FIG. 4 is a photograph of a scanning electron microscope image of an electrically conductive material including nanowires and nanoconnectors mixed in a ratio of 3:2 (or mixed in a ratio value of 1.5) according to the second exemplary embodiment of the present disclosure. As shown in the photograph of FIG. 4, the nanoconnectors fill the pores between the nanowires, with a filling rate higher than that of the mixture having a nanoconnector to nanowire ratio of 4:1.

Figure 5:
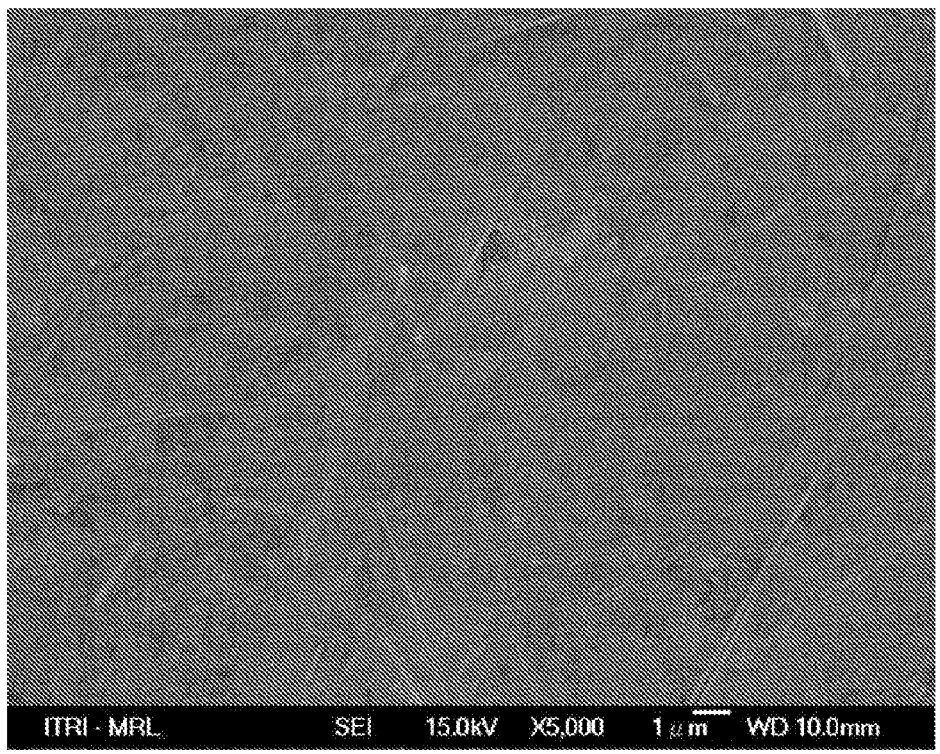
FIG. 5 is a photograph of a scanning electron microscope image of an electrically conductive material including nanowires and nanoconnectors mixed in a ratio of 2:3 according to the third exemplary embodiment of the present disclosure.

FIG. 5 is a photograph of a scanning electron microscope image of an electrically conductive material including nanowires and nanoconnectors mixed in a ratio of 2:3 (or mixed in a ratio value of 0.7) according to the third exemplary embodiment of the present disclosure. As shown in the photograph of FIG. 5, the nanoconnectors can sufficiently fill the pores between the nanowires so that the surface of the electrically conductive material can be substantially flat.

Figure 6:
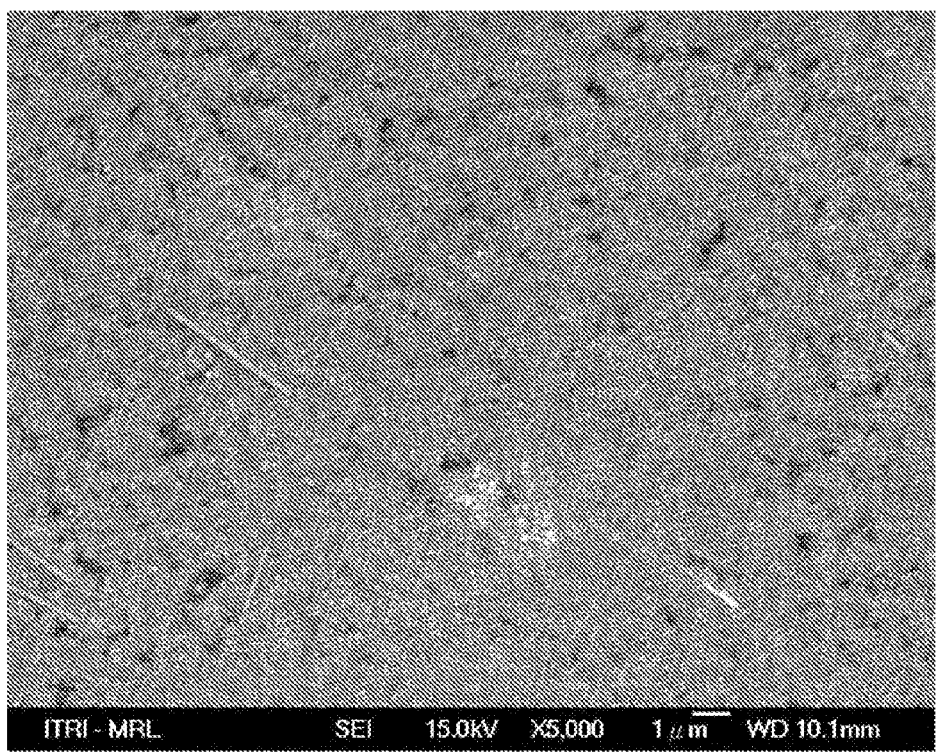
FIG. 6 is a photograph of a scanning electron microscope image of an electrically conductive material including nanowires and nanoconnectors mixed in a ratio of 1:4 according to the fourth exemplary embodiment of the present disclosure.

FIG. 6 is a photograph of a scanning electron microscope image of an electrically conductive material including nanowires and nanoconnectors mixed in a ratio of 1:4 (or mixed in a ratio value of 0.3) according to the fourth exemplary embodiment of the present disclosure. As shown in the photograph of FIG. 6, the nanoconnectors can completely fill the pores between the nanowires, consequently producing an electrically conductive material with a flat surface.

Figure 7:
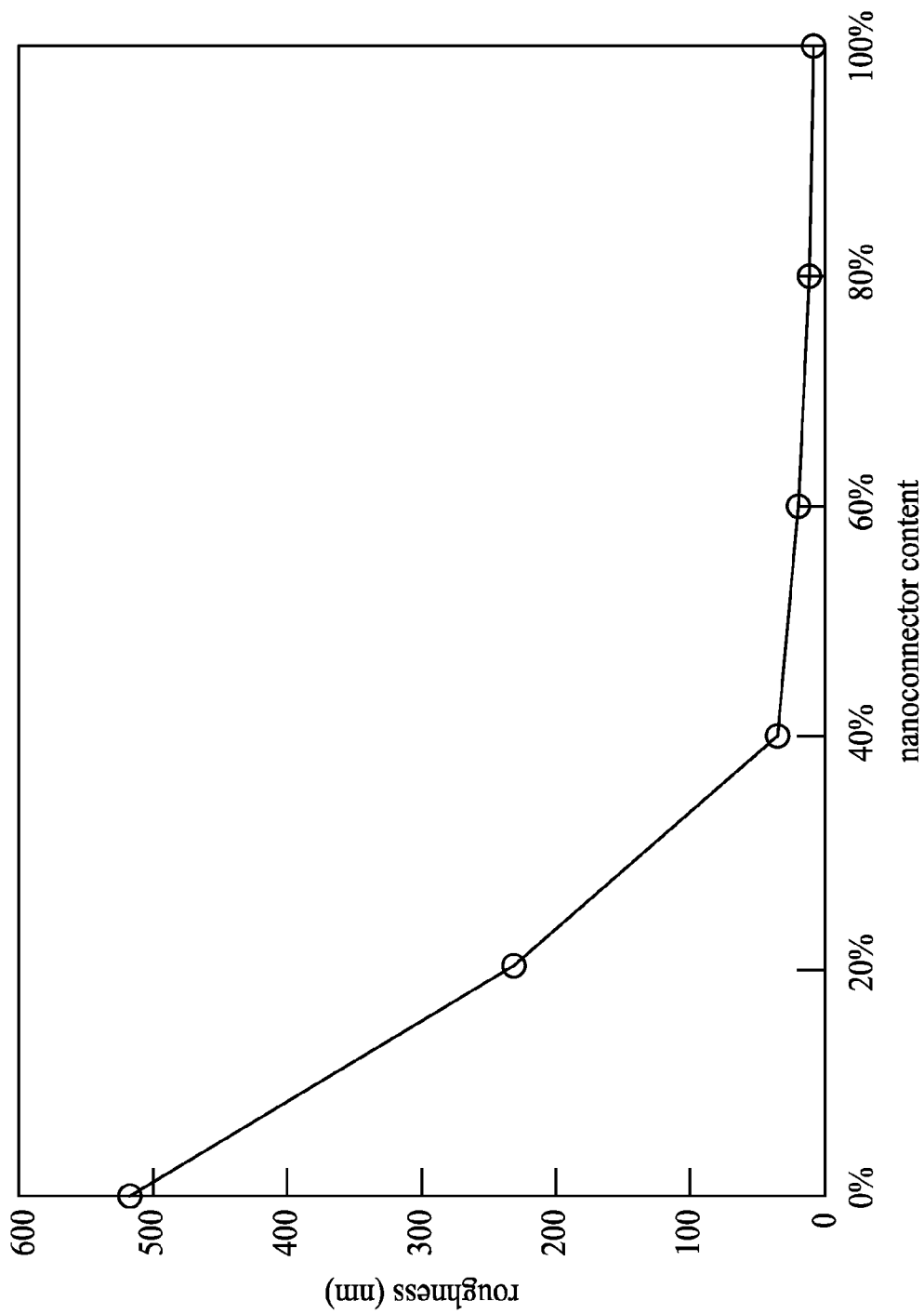
FIG. 7 is a diagram showing a curve of surface roughness as a function of nanoconnector content, demonstrating the variation of the surface roughness of an electrically conductive material mixed with different ratios of nanoconnectors and nanowires according to one exemplary embodiment of the present disclosure.

FIG. 7 is a diagram showing a curve of surface roughness as a function of nanoconnector content, demonstrating the variation of the surface roughness of an electrically conductive material mixed with different ratios of nanoconnectors and nanowires according to one exemplary embodiment of the present disclosure. The electrically conductive material without addition of nanoconnectors has surface roughness over 500 nanometers. When the nanowires and the nanoconnectors are mixed in a ratio of 4:1, the surface roughness of the electrically conductive material can be reduced to below 250 nanometers. When the ratio of the nanowires and the nanoconnectors is changed to 3:2 by lowering the content of the nanowires, the surface roughness of the electrically conductive material can be below 50 nanometers. Beyond that, as the content of nanoconnectors increases, the surface roughness of the electrically conductive material is reduced slowly. In other words, when the content of nanoconnectors is below 40 percent, the surface roughness of the electrically conductive material can be significantly reduced. Moreover, when the content of nanoconnectors is 40 percent by weight, the surface roughness of the electrically conductive material can be improved by 93 percent relative to the surface roughness of the electrically conductive material having no nanoconnectors. Consequently, mixing nanowires with nanoconnectors can obviously reduce the surface roughness of the electrically conductive material.

The solvent used in the resulting composition can be water, alcohol (such as methanol, butanol, isopropyl alcohol, terpineol, or ethylene glycol, etc.), ketone (such as acetone or cyclohexanone), an aroma solvent (such as toluene or xylene), ether (such as ethylene glycol monomethyl ether, ethylene glycol monobutylether, etc.), and ester such as polyvinyl acetate. The linker of the conductive ink can be a polymer such as polyethylene, polyvinyl alcohol, polyethylene glycols, and polymethyl methacrylate. Other auxiliary agents can be methylcellulose, ethyl cellulose, hydroxyethylcellulose or sodium alginate.

The above-mentioned solidified conductive material can be heated to a temperature of 200 degrees Celsius for one hour, or can be exposed to low energy light to increase the electrical conductivity thereof.

Figure 8:
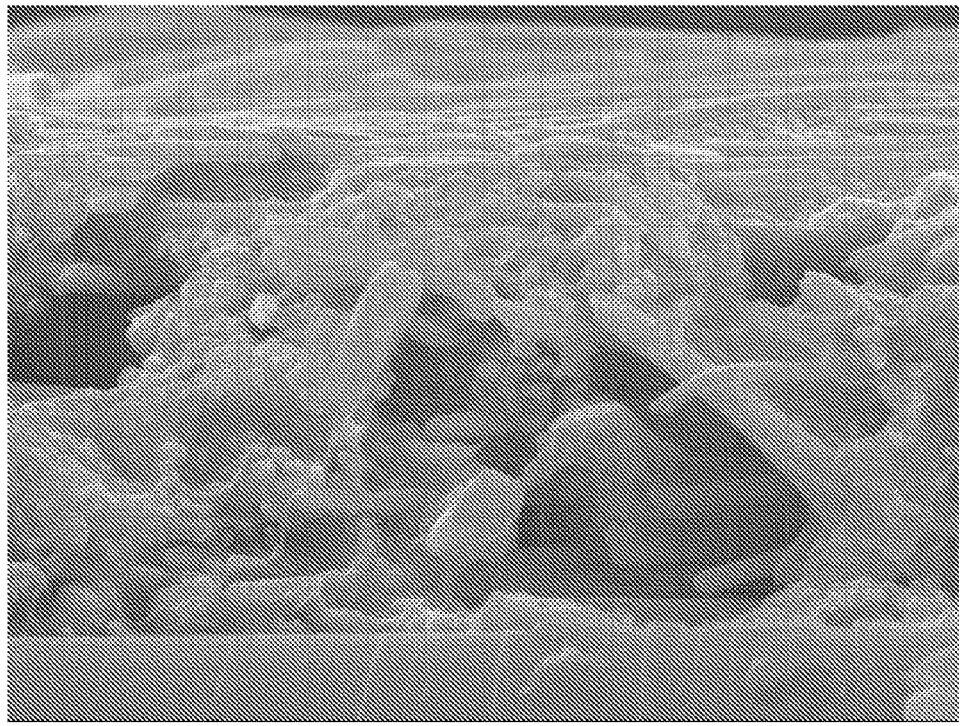
FIG. 8 is a photograph of a scanning electron microscope image of an electrically conductive material heated to 200 degrees Celsius according to the first exemplary embodiment of the present disclosure.

FIG. 8 is a photograph of a scanning electron microscope image of an electrically conductive material heated to 200 degrees Celsius, which includes nanowires and nanoconnectors mixed in a ratio of 4:1 by weight according to the first exemplary embodiment of the present disclosure. The photograph shows that after sintering, the electrically conductive material includes thick partially continuing structures, elongated bulk structures, and bulk particles having a size over 200 nanometers.

Figure 9:
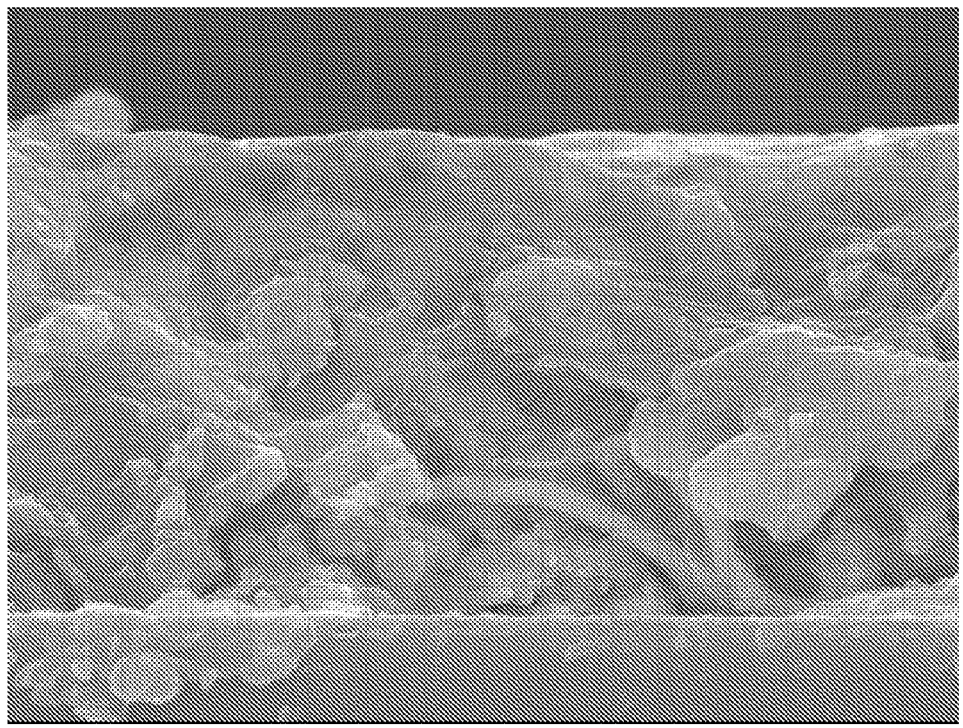
FIG. 9 is a photograph of a scanning electron microscope image of an electrically conductive material heated to 200 degrees Celsius according to the second exemplary embodiment of the present disclosure.

FIG. 9 is a photograph of a scanning electron microscope image of an electrically conductive material heated to 200 degrees Celsius, which includes nanowires and nanoconnectors mixed in a ratio of 3:2 by weight according to the second exemplary embodiment of the present disclosure. The photograph shows that after sintering, the electrically conductive material includes thick partially continuing structures, elongated bulk structures, bulk particles, and plate structures.

Figure 10:
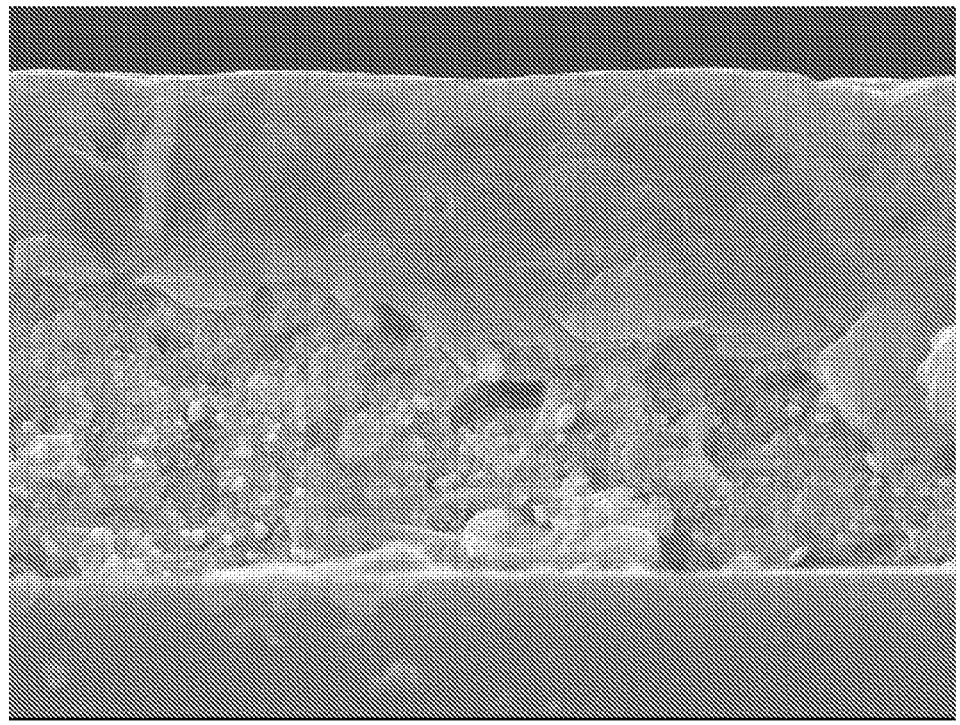
FIG. 10 is a photograph of a scanning electron microscope image of an electrically conductive material heated to 200 degrees Celsius according to the third exemplary embodiment of the present disclosure.

FIG. 10 is a photograph of a scanning electron microscope image of an electrically conductive material heated to 200 degrees Celsius, which includes nanowires and nanoconnectors mixed in a ratio of 2:3 by weight according to the third exemplary embodiment of the present disclosure. The photograph shows that after sintering, the electrically conductive material includes thick partially continuing structures, bulk structures, and bulk particles.

Figure 11:
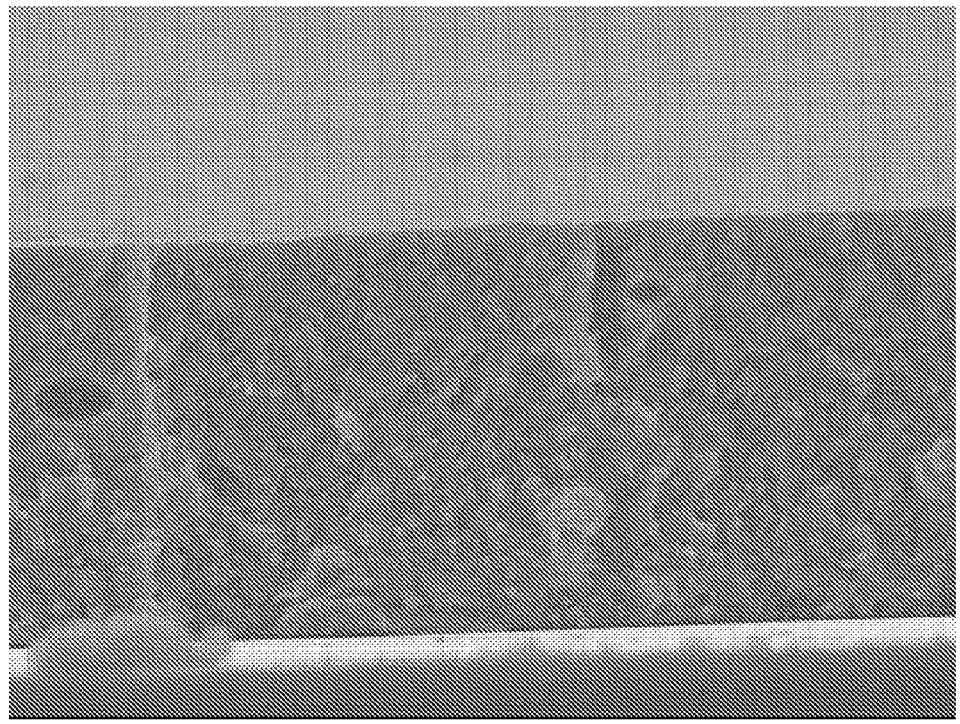
FIG. 11 is a photograph of a scanning electron microscope image of an electrically conductive material heated to 200 degrees Celsius according to the fourth exemplary embodiment of the present disclosure.

FIG. 11 is a photograph of a scanning electron microscope image of an electrically conductive material heated to 200 degrees Celsius, which includes nanowires and nanoconnectors mixed in a ratio of 1:4 by weight according to the fourth exemplary embodiment of the present disclosure. The photograph shows that after sintering, the electrically conductive material includes lump structures and bulk particles attached to the lump structures.

Figure 12:
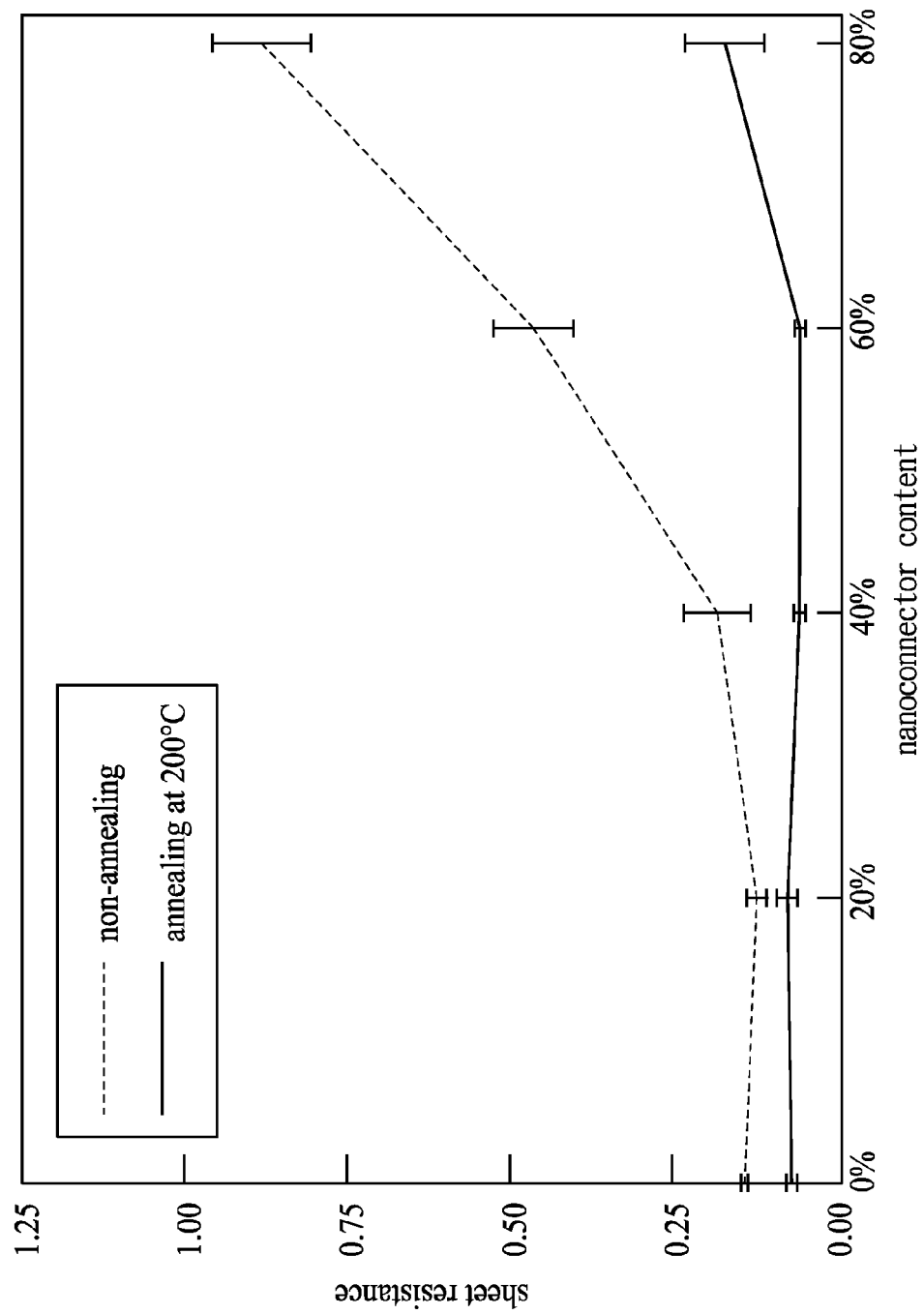
FIG. 12 is a diagram showing a curve of sheet resistance in ohms per square as a function of silver nanoconnector content, demonstrating the variation of the sheet resistance of an electrically conductive material mixed with different ratios of silver nanoconnectors and silver nanowires according to one exemplary embodiment of the present disclosure.

FIG. 12 is a diagram showing a curve of sheet resistance in ohms per square as a function of silver nanoconnector content, demonstrating the variation of the sheet resistance of an electrically conductive material mixed with different ratios of silver nanoconnectors and silver nanowires according to one exemplary embodiment of the present disclosure. As shown in FIG. 12, the electrically conductive materials including silver nanowires and silver nanoconnectors mixed in different ratios have obviously different sheet resistances. The sheet resistances, represented by a dashed line, of the electrically conductive materials that are solidified but not annealed can be gradually reduced by adding a small quantity of silvered nanoconnectors into the network structure of the silver nanowires. When 20 percent by weight of silver nanoconnectors is added into the network structure formed by the nanowires, the sheet resistance is reduced by roughly 20 percent. Thus, the addition of silver nanoconnectors can increase the electrical conductivity. Thereafter, the sheet resistance increases as the ratio of the silver nanoconnectors increases.

In addition, after heating to 200 degrees Celsius, the sheet resistances, represented by the solid line, of all conductive materials are reduced. Specifically, the sheet resistances of the electrically conductive materials having high nanoconnector content are reduced significantly, and the electrically conductive materials with 20 to 60 percent by weight of nanoconnectors have lower sheet resistances.

Example 2

Example 2 demonstrates a method for manufacturing an electrically conductive material that can be formed at room temperature. Twenty grams of mixed silver nanoconnectors and silver nanowires (nanowires:nanoconnectors=4:1) is introduced into 100 grams of a low melting point solvent (i.e., ethanol or isopropyl alcohol), and the mixture is stirred using a stirrer. After the addition of 1.5 grams of polyvinyl-pyrrolidone used as a linker, the mixture is stirred again. After the addition of about 0.3 grams of BYK-410 from Byk-Chemie, Germany, the mixture is stirred, and the mixture or the resulting composition can now be used as a conductive ink. The resulting composition is coated on a substrate and dried at room temperature for about 20 minutes to solidify, and an electrically conductive material is formed on the substrate. Tests have shown that when the thickness of the electrically conductive material is 3 micrometers, its electrical conductivity can be $3.0 \times 10^6$ S/m, and its sheet resistance can be 0.11 ohms/square. Therefore, as the content ratio of nanoconnectors increases, the sheet resistance increases as well.

Example 3

Example 3 demonstrates a method for manufacturing conductive material using a screen printing technique. First, 1.5 grams of methylcellulose used as thickener is introduced into 50 grams of water used as solvent, and the mixing solution is stirred. Fifty grams of mixed silver nanoconnectors and silver nanowires (nanowires:nanoconnectors=4:1) is introduced into the mixing solution, and then the mixing solution is stirred. After the addition of about 0.3 grams of BYK-410 from Byk-Chemie, Germany, the mixing solution is stirred, and after that, the mixing solution or the resulting composition can now be used as a conductive ink. The resulting composition is coated on a substrate and heated to a temperature of 100 degrees Celsius for about 20 minutes to solidify, and an electrically conductive material is preliminarily formed on the substrate. Results of testing have shown that when the thickness of the electrically conductive material is 124 micrometers, its sheet resistance is 0.09 ohms/square.

Figure 13:
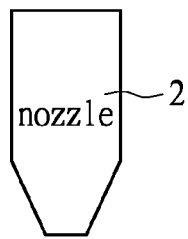
FIGS. 13 to 15 are schematic diagrams showing the processing steps for forming conductive films using a spray coating technique according to one exemplary embodiment of the present disclosure.
Figure 14:
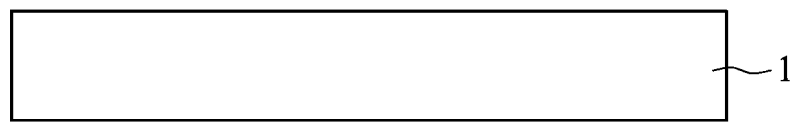
Figure 14:
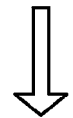
Figure 15:
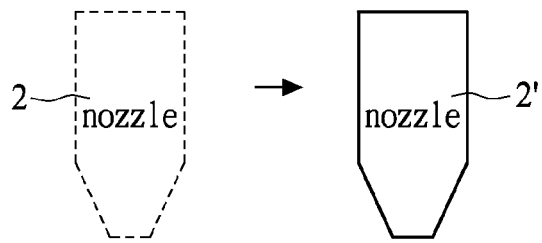
Figure 15:
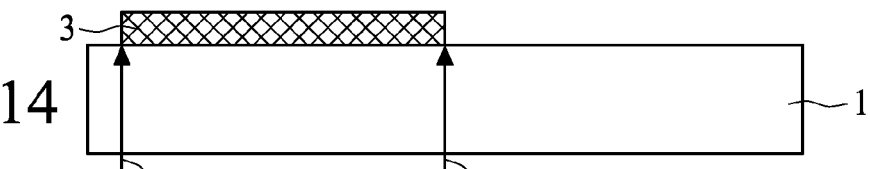

FIGS. 13 to 15 are schematic diagrams showing the processing steps for manufacturing conductive films 3 and 3' using a spray coating technique according to one exemplary embodiment of the present disclosure. As shown in FIG. 13, a substrate 1 is initially provided. The material of the substrate 1 can be polyethylene terephthalate, polyimide, silicon, or glass. As shown in FIG. 14, the above-mentioned resulting composition for spray coating can then be sprayed on the substrate 1 using a nozzle 2 to form an electrically conductive film 3. The electrically conductive film 3 can be formed between the locations (indicated by the arrow 20 and 21) on the substrate 1 to which the nozzle 2 moves. As shown in FIG. 15, the nozzle 2 can thereafter move to the location indicated by the arrow 22 using a programmable device, and then the nozzle 2 can start to deliver the solution to form the conductive film 3'. Finally, the patterned conductive films 3 and 3' can be obtained. The patterned conductive films 3 and 3' can be heated or exposed to light to increase their electrical conductivity. In one embodiment, the light can have a wavelength of from 300 nm to 900 nm. The conductive films 3 and 3' can be used for electromagnetic shielding and preventing static electricity, and the above-mentioned manufacturing method can be used for manufacturing the electrically conductive layers of liquid crystal panels, solar panels, etc.

Figure 16:
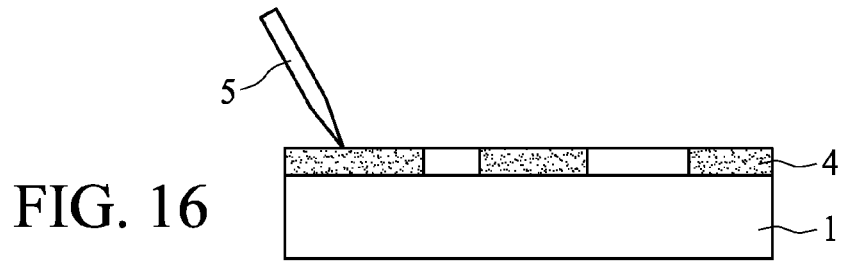
FIGS. 16 to 20 are schematic diagrams showing the processing steps for forming conductive films using a screen printing technique according to one exemplary embodiment of the present disclosure.
Figure 17:
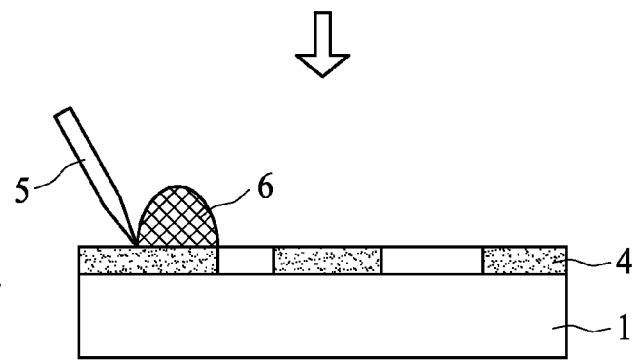
Figure 18:
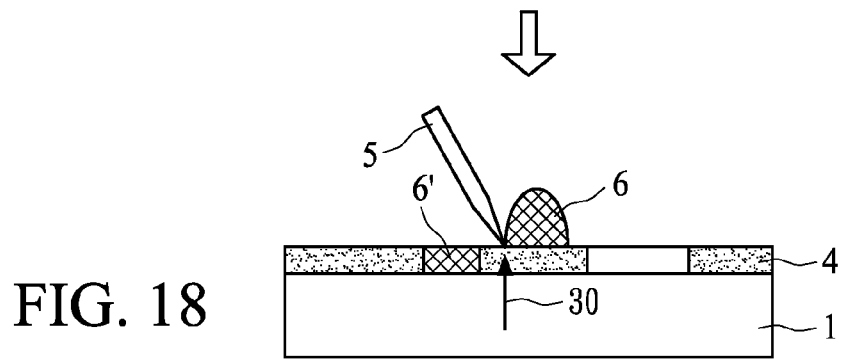
Figure 19:
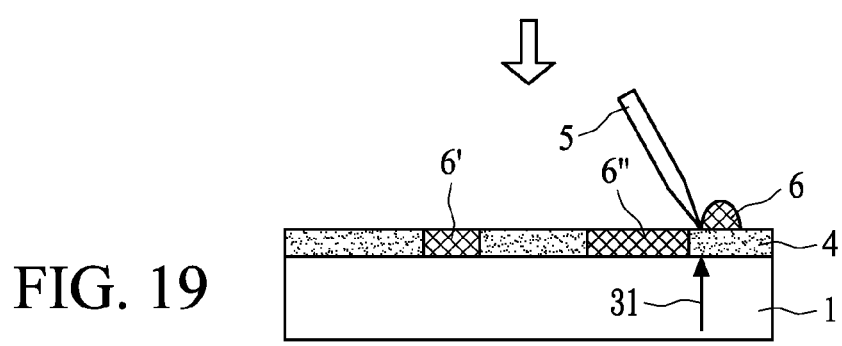
Figure 20:
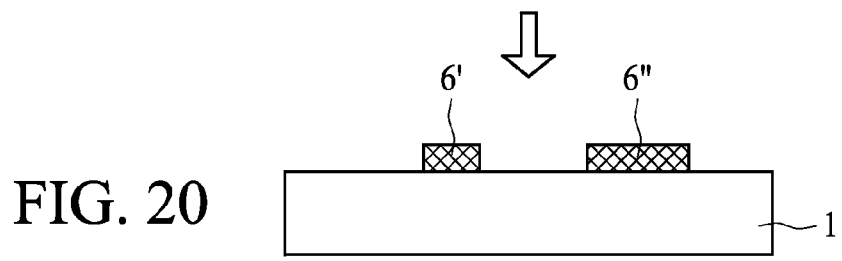

FIGS. 16 to 20 are schematic diagrams showing the processing steps for forming conductive films 6' and 6" using a screen printing technique according to one exemplary embodiment of the present disclosure. Referring to FIG. 16, a substrate 1 is initially provided with a patterned screen 4 and squeegee 5 placed thereon. The material of the substrate 1 can be polyethylene terephthalate, polyimide, silicon, or glass. As shown in FIG. 17, the resulting composition 6 configured for screen printing is disposed on the screen 4. As shown in FIG. 18, the squeegee 5 is horizontally moved to the location indicated by the arrow 30, and the holes in the moving path of the squeegee 5 can be filled by the resulting composition 6 so as to form a conductive film 6' contacting the substrate 1. As shown in FIG. 19, the remaining resulting composition 6 is moved by the squeegee 5 to other locations to fill all holes disposed on the screen 4 to form conductive film 6". As shown in FIG. 20, the screen 4, the squeegee 5, and the remaining resulting composition 6 are removed from the substrate 1, and thereafter, an electrically conductive film on the substrate 1 can be obtained. The patterned conductive films 6' and 6" can be heated or exposed to light to increase electrical conductivity.

In summary, the electrically conductive material of the present disclosure can include nanoconnectors and nanowires simultaneously so as to improve its surface roughness and increase its electrical conductivity. The electrically conductive material can be annealed to further increase its electrical conductivity.

The above-described exemplary embodiments are intended to be illustrative only. Those skilled in the art may devise numerous alternative embodiments without departing from the scope of the following claims.

We claim:

1. An electrically conductive material formed by using light or thermal energy, the electrically conductive material comprising:
 a plurality of nanowires; and
 a plurality of melted nanoconnectors configured to interconnect to the plurality of nanowires so as to smooth a surface flatness and to increase a density and an electrical conductivity, wherein a ratio by weight of the nanowires to the nanoconnectors is in a range of 1:9 to 9.1.

2. The electrically conductive material of claim 1, wherein the nanowire has an aspect ratio of from 10 to 800.

3. The electrically conductive material of claim 2, wherein the nanowire has an aspect ratio of from 200 to 500.

4. The electrically conductive material of claim 1, wherein the nanoconnector has a diameter of less than 100 nanometers.

5. The electrically conductive material of claim 1, wherein the ratio by weight of the nanowires to the nanoconnectors is from 2:3 to 4:1.

6. The electrically conductive material of claim 1, wherein the material of the nanowire is gold, silver, copper, or a combination thereof.

7. The electrically conductive material of claim 1, wherein the material of the nanoconnector is gold, silver, copper, or a combination thereof.

8. The electrically conductive material of claim 1, wherein the material of the nanowire is gold-coated silver, silver-coated gold, gold-coated copper, copper-coated gold, silver-coated copper, copper-coated silver, or a combination thereof.

9. The electrically conductive material of claim 1, wherein the material of the nanoconnector is gold-coated silver, silver-coated gold, gold-coated copper, copper-coated gold, silver-coated copper, copper-coated silver, or a combination thereof.

10. The electrically conductive material of claim 1, wherein the electrically conductive material comprises a conductive film.

11. A method for forming an electrically conductive material using light or thermal energy, the method comprising:
 providing a resulting composition including a plurality of nanowires and a plurality of nanoconnectors, wherein a ratio by weight of the nanowires to the nanoconnectors is in a range of from 1:9 to 9.1;
 drying the resulting composition to obtain a mixture of the nanowires and the nanoconnectors; and
 melting the plurality of nanoconnectors to interconnect with the plurality of nanowires so as to smooth a surface flatness and to increase a density and an electrical conductivity.

12. The method of claim 11, further comprising a step of heating the mixture to a temperature below 200 degrees Celsius.

13. The method of claim 11, further comprising a step of applying light with wavelength of from 300 nm to 900 nm to the mixture to increase the electrical conductivity of the mixture.

14. The method of claim 11, wherein the nanowire has an aspect ratio of from 10 to 800.

15. The method of claim 14, wherein the nanowire has an aspect ratio of from 200 to 500.

16. The method of claim 11, wherein the nanoconnector has a diameter of less than 100 nanometers.

17. The method of claim 11, wherein the ratio by weight of the nanowires to the nanoconnectors is in a range of from 2:3 to 4:1.

18. The method of claim 11, wherein the material of the nanowire is gold, silver, copper, or a combination thereof.

19. The method of claim 11, wherein the material of the nanoconnector is gold, silver, copper, or a combination thereof.

20. The method of claim 11, wherein the material of the nanowire is gold-coated silver, silver-coated gold, gold-coated copper, copper-coated gold, silver-coated copper, copper-coated silver, or a combination thereof.

21. The method of claim 11, wherein the material of the nanoconnector is gold-coated silver, silver-coated gold, gold-coated copper, copper-coated gold, silver-coated copper, copper-coated silver, or a combination thereof.

22. The method of claim 11, wherein the resulting composition comprises a solvent, and the solvent is water, alcohol, ketone, an aroma solvent, ether, ester, or a combination thereof, and a ratio by weight of the solvent to the resulting composition is in a range of from 10 to 80 percent.

23. The method of claim 22, wherein the solvent is water, methanol, butanol, isopropyl alcohol, terpineol, ethylene glycol, acetone, cyclohexanone, toluene and xylene, ethylene glycol monomethyl ether, ethylene glycol monobutylether, or polyvinyl acetate.

24. An electrically conductive composition comprising:
a resulting solvent;
a plurality of nanowires; and
a plurality of melted nanoconnectors configured to interconnect to the plurality of nanowires so as to smooth a surface flatness and to increase a density and an electrical conductivity, wherein a ratio by weight of the nanowires to the nanoconnectors is in a range of from 1:9 to 9:1, a surface roughness of the composition being greatest when the ratio is 9:1 and being least when the ratio is 1:9.

25. The electrically conductive composition of claim 24, wherein the nanowire has an aspect ratio of from 10 to 800.

26. The electrically conductive composition of claim 25, wherein the nanowire has an aspect ratio of from 200 to 500.

27. The electrically conductive composition of claim 24, wherein the nanoconnector has a diameter of less than 100 nanometers.

28. The electrically conductive composition of claim 24, wherein the ratio by weight of the nanowires to the nanoconnectors is in a range of from 2:3 to 4:1.

29. The electrically conductive composition of claim 24, wherein the material of the nanowire is gold, silver, copper, or a combination thereof.

30. The electrically conductive composition of claim 24, wherein the material of the nanoconnector is gold, silver, copper, or a combination thereof.

31. The electrically conductive composition of claim 24, wherein the material of the nanowire is gold-coated silver, silver-coated gold, gold-coated copper, copper-coated gold, silver-coated copper, copper-coated silver, or a combination thereof.

32. The electrically conductive composition of claim 24, wherein the material of the nanoconnector is gold-coated silver, silver-coated gold, gold-coated copper, copper-coated gold, silver-coated copper, copper-coated silver, or a combination thereof.

33. The electrically conductive composition of claim 24, wherein the resulting composition comprises a solvent, and the solvent is water, alcohol, ketone, an aroma solvent, ether, ester, or a combination thereof, wherein a ratio by weight of the solvent to the nano-scale composition is from 10 to 80 percent.

34. The electrically conductive composition of claim 33, wherein the solvent is water, methanol, butanol, isopropyl alcohol, terpineol, ethylene glycol, acetone, cyclohexanone, toluene and xylene, ethylene glycol monomethyl ether, ethylene glycol monobutylether, or polyvinyl acetate.

35. The electrically conductive composition of claim 24, further comprising a polymer, wherein a ratio by weight of the polymer to the electrically conductive composition is less than 20 percent.

36. The electrically conductive composition of claim 35, wherein the polymer is polyethylene, polyvinyl alcohol, polyethylene glycols, polymethyl methacrylate, methylcellulose, ethylcellulose, hydroxyethylcellulose or sodium alginate.

37. The electrically conductive composition of claim 24, further comprising a thixotropical agent, wherein a ratio by weight of the thixotropical agent to the electrically conductive composition is less than 5 percent.

* * * * *